(12) United States Patent
Moenter et al.

(10) Patent No.: US 8,052,189 B2
(45) Date of Patent: Nov. 8, 2011

(54) TRIM RING HAVING REINFORCED SNAP POSTS

(75) Inventors: Jonathan Keith Moenter, Ann Arbor, MI (US); Kevin Lyle Gilleo, Dexter, MI (US); Michael Harry Weiss, Zeeland, MI (US)

(73) Assignees: Toyota Motor Engineering & Manufacturing North America, Inc., Erlanger, KY (US); Johnson Controls Technology Company, Holland, MI (US)

( * ) Notice: Subject to any disclaimer, the term of this patent is extended or adjusted under 35 U.S.C. 154(b) by 39 days.

(21) Appl. No.: 12/628,645

(22) Filed: Dec. 1, 2009

(65) Prior Publication Data

US 2011/0127804 A1    Jun. 2, 2011

(51) Int. Cl.
*B60R 13/02* (2006.01)
(52) U.S. Cl. ....................................... 296/1.08; 296/214
(58) Field of Classification Search ................. 296/1.08, 296/214, 1.02, 216.06, 216.07, 97.9
See application file for complete search history.

(56) References Cited

U.S. PATENT DOCUMENTS

| 5,105,521 | A | 4/1992 | Dowd et al. |
| 6,003,928 | A | 12/1999 | Curtindale |
| 6,409,246 | B1 | 6/2002 | Rennie |
| 7,309,090 | B2 * | 12/2007 | Troton ........................ 296/1.08 |
| 7,644,975 | B2 * | 1/2010 | Ryan et al. ............... 296/136.01 |
| 2007/0085361 | A1 * | 4/2007 | Hauser ........................ 296/1.08 |
| 2009/0015038 | A1 * | 1/2009 | Marx et al. .................... 296/214 |
| 2010/0127536 | A1 * | 5/2010 | Dykman et al. ......... 296/216.07 |

FOREIGN PATENT DOCUMENTS

EP    000572916 A1 * 12/1993 ............... 296/216.07

* cited by examiner

*Primary Examiner* — Jason S Morrow
(74) *Attorney, Agent, or Firm* — Gifford, Krass, Sprinkle, Anderson & Citkowski, P.C.

(57) ABSTRACT

A snap post for use in conjunction with a snap lid to attach a trim ring to an opening of a headliner of an automotive vehicle is provided. The snap post includes an elongated leg extending outwardly from the trim ring. The elongated leg has a barb for engaging with the snap lid disposed on a distal end thereof. A support structure provides the elongated leg with sufficient reinforcement to withstand the stress imposed during the installation of the headliner, yet provides sufficient flexibility for the quick and easy attachment of the trim ring to the opening of the headliner.

19 Claims, 4 Drawing Sheets

0
TRIM RING HAVING REINFORCED SNAP POSTS

FIELD OF THE INVENTION

The present invention relates generally to a trim ring for a headliner of an automotive vehicle and, more particularly, to a trim ring snap post having a support structure.

BACKGROUND OF THE INVENTION

Modern automotive vehicles commonly include a sunroof opening formed in the roof and also typically include a headliner for covering the inner surfaces of the roof so as to provide an aesthetically pleasing appearance to the passenger compartment. The headliner for vehicles having a sunroof includes an opening allowing access to the sunroof from the passenger compartment.

Often a trim ring is installed into the opening formed in the headliner to provide a more finished appearance to the peripheral edge of the opening. The trim ring is attached to the headliner through the use of a number of attachments which compress the headliner between an outwardly extending flange and a snap lid. An elongated leg extending from the flange of the trim ring having a barb disposed at a distal end, is known as a snap post, is positioned on either side of the snap lid to snap lock the headliner between the flange and the trim ring snap lid.

In order to increase the production efficiency during the assembly of the automotive vehicle, the trim rings are attached to the opening of the headliner in advance of the attachment of the headliner to the roof of the automotive vehicle. By previously attaching the trim rings to the headliner, the installation time required to install the headliner is significantly reduced as all that is required is to attach the headliner to the roof of the automotive vehicle. However, a problem arises during the installation of the headliner.

As the headliner is installed it is often inadvertently subjected to bending, flexing and/or twisting stresses which are consequently transferred to the previously attached trim ring. Due to the stress imposed on the trim ring, the snap posts are liable to detach from the snap lock engagement with the snap lid, thereby, unattaching the trim ring from the headliner. Production efficiency is reduced as the installation process of the headliner must be stopped, and the trim must be reattached to the opening prior to the installation of the headliner.

It is known in the art to provide the snap posts with a gusset extending between the flange and the snap post to counteract the detachment of the trim ring during the installation of the headliner. However, the currently used gussets offer poor snap post reinforcement as the trim ring is still liable to detach from the headliner during installation. Thus, there exists a need for an improved trim ring having a reliable snap post support structure to reinforce the snap post in locking engagement with the snap lid during the installation of the headliner.

SUMMARY OF THE INVENTION

The present invention provides an improved trim ring which overcomes the above-mentioned disadvantages of the previously known trim rings.

In brief, a snap post for use in conjunction with a trim ring snap lid to attach a trim ring to an opening of a headliner of an automotive vehicle is provided. The snap post includes an elongated leg extending outwardly from the trim ring. The elongated leg has a barb for engaging with the trim ring snap lid disposed on a distal end thereof. A support structure includes a support leg spaced apart from and parallel to the elongated leg and a support arm extending from the elongated leg to a distal end of the support leg. The support structure provides the elongated leg with sufficient reinforcement to withstand the stress imposed during the installation of the headliner, yet provides sufficient flexibility for the quick and easy attachment of the trim ring to the opening of the headliner.

BRIEF DESCRIPTION OF THE DRAWINGS

A better understanding of the present invention will be had upon reference to the following detailed description when read in conjunction with the accompanying drawings, wherein like reference characters refer to like parts throughout the several views and in which.

DETAILED DESCRIPTION OF A PREFERRED EMBODIMENT OF THE PRESENT INVENTION

The present invention has utility as a trim ring having a snap post support structure which overcomes the above-mentioned disadvantages. The inventive trim ring provides an assembly team member with a reliable attachment of the trim ring to the opening of the headliner which can avoid detachment during the installation of the headliner to the automotive vehicle.

Figure 1:
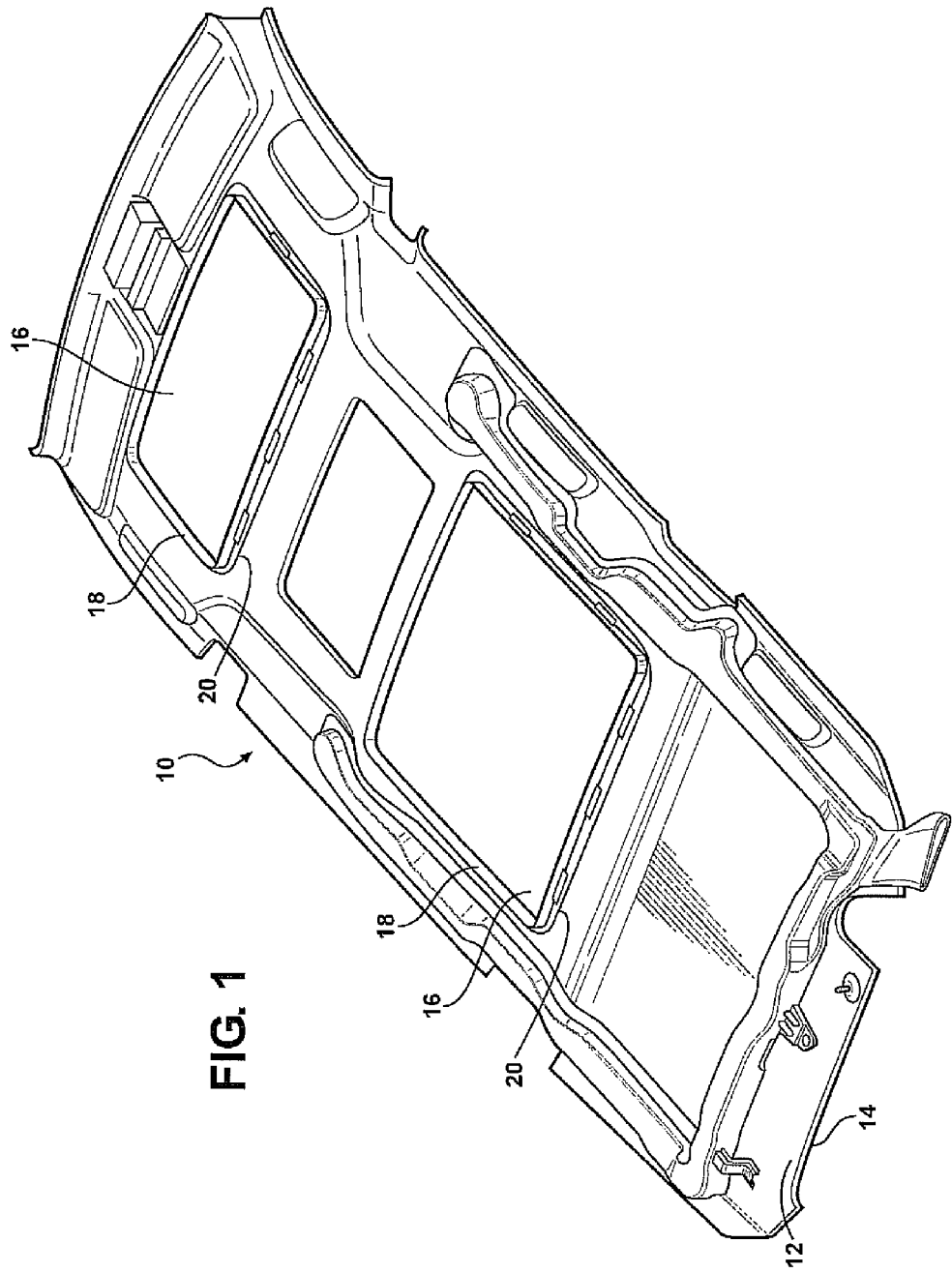
FIG. 1 is a top perspective view illustrating a headliner having a trim ring attached thereto.

With reference to FIG. 1, a headliner is generally illustrated at 10. The headliner 10 is attached at various locations to an inner surface of a roof of an automotive vehicle. The headliner 10 includes an upper, nonexposed surface 12 which faces the inner surface of the roof and a lower, exposed surface 14 which faces the passenger compartment of the automotive vehicle. Openings 16 are formed in the headliner 10 for use in conjunction with a sun/moon roof aperture formed in the front and/or rear of the automotive vehicle roof.

Figure 2:
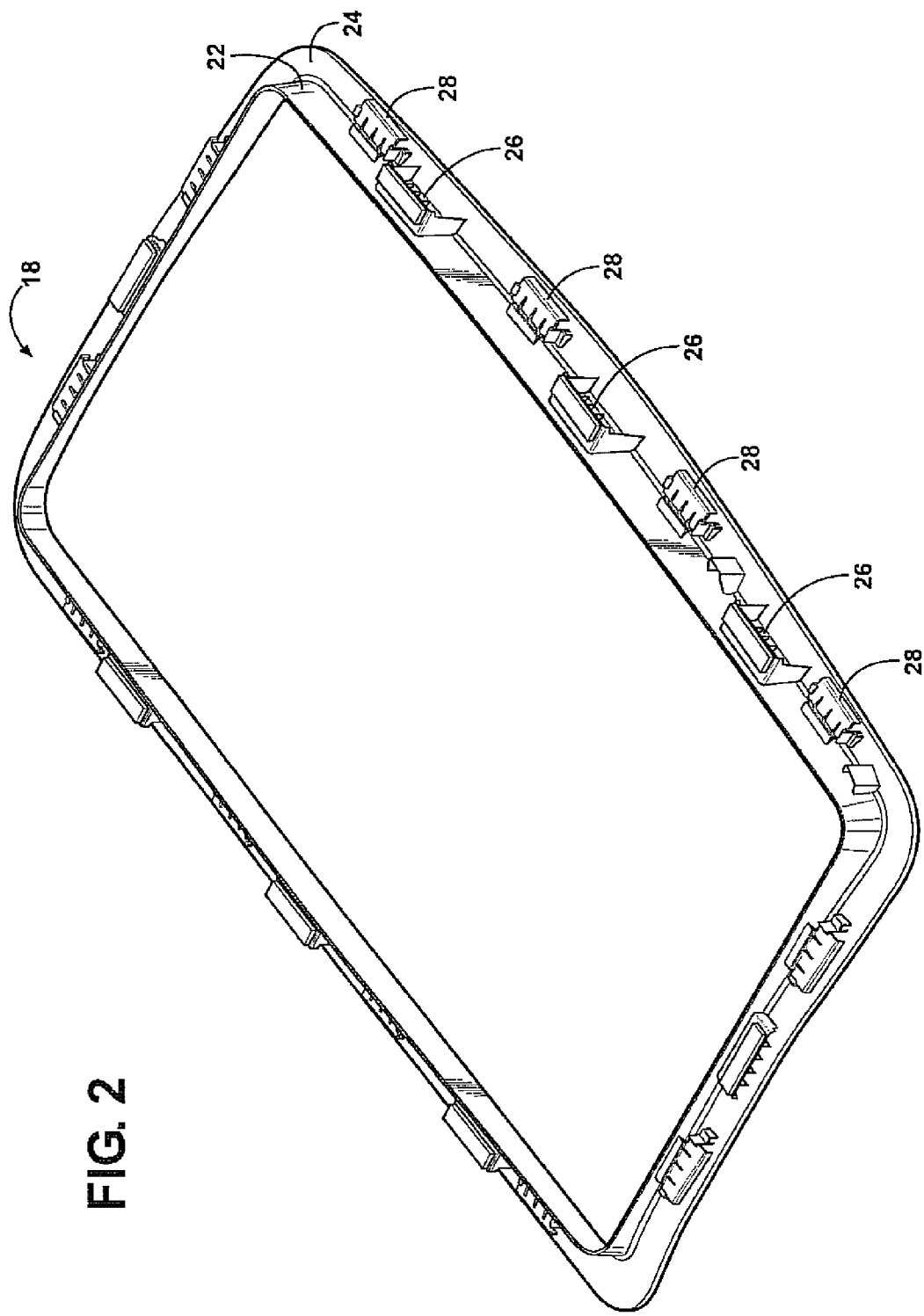
FIG. 2 is a top perspective view of a trim ring having the inventive snap post.

Trim rings 18 are inserted into the openings 16 to bound the peripheral edge 20 of the openings 16. As seen in FIG. 2, the trim ring 18 includes a generally upright main wall 22 and a flange 24 which extends outwardly from the main wall 22. A number of fasteners 26 are disposed around the trim ring 18 between the main wall 22 and the flange 24. In addition, a number of attachments 28 are intermittently disposed between the number of fasteners 26 along the trim ring 18 to secure the trim ring 18 to the headliner 10. The fasteners 26 are used to secure the trim ring 18, and consequently the attached headliner 10, to the inner surface of the roof. The trim ring 18 is molded of a plastic material with the fasteners 26 and the attachments integrally molded therewith.

Figure 3:
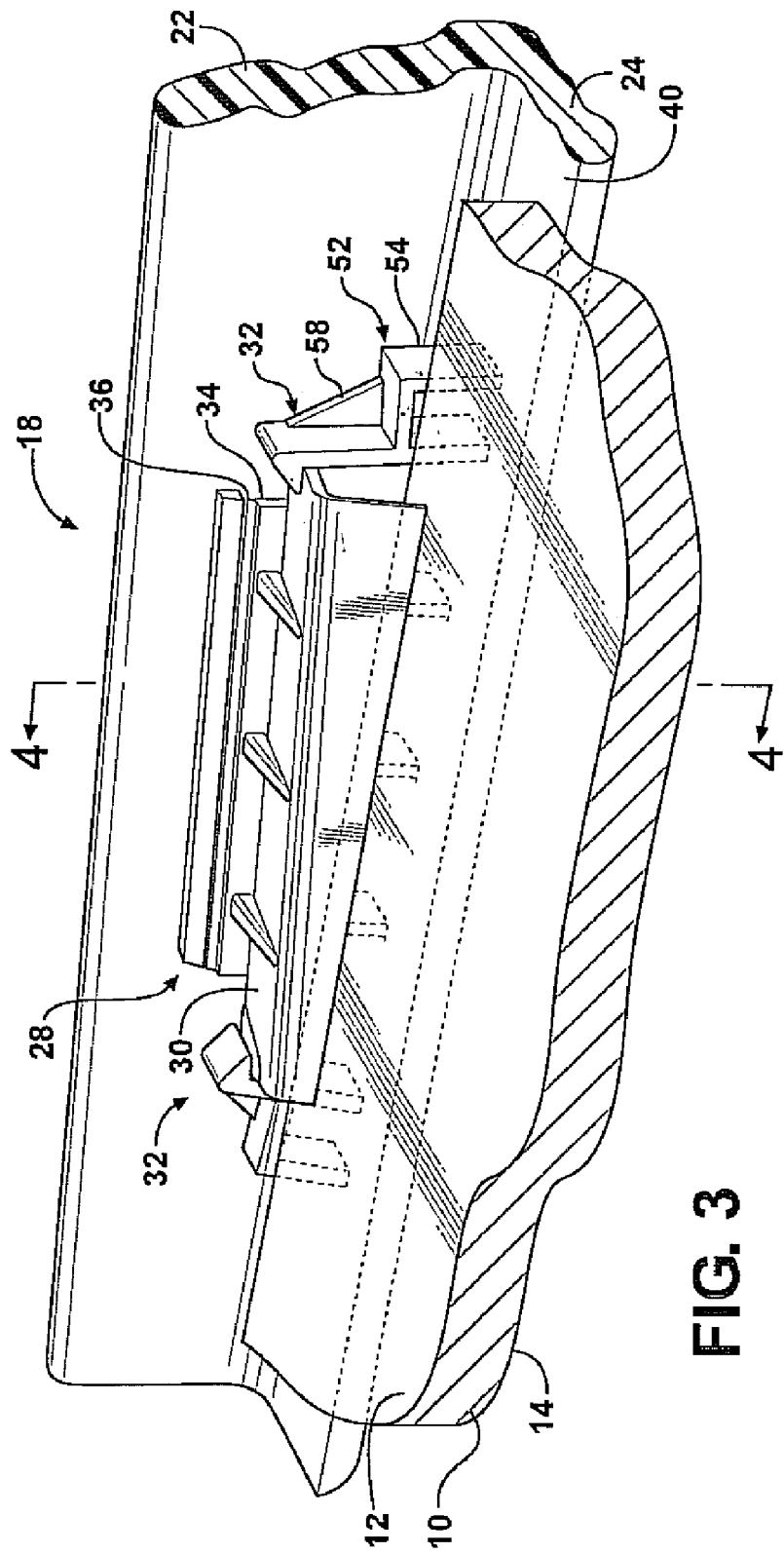
FIG. 3 is a partial perspective view illustrating the connection between the trim ring and the headliner.
Figure 4:
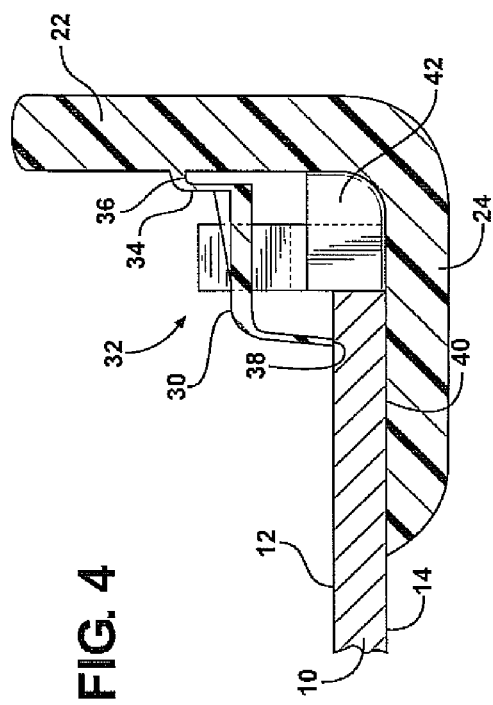
FIG. 4 is a cross-sectional view taken along the line 4-4 of FIG. 3.

Referring to FIGS. 3 and 4, the attachment 28 includes a snap lid 30 and a snap post 32 disposed on either side of the snap lid 30. The snap lid 30 is attached to the main wall 22 at a proximal end 34 by a living hinge 36. The living hinge 36 allows the snap lid 30 to pivot with respect to the trim ring 18. A distal end 38 of the snap lid 30 contacts the upper, nonexposed surface 12 of the headliner 10. The lower, exposed surface 14 of the headliner contacts an upper surface 40 of the flange 24 to position the headliner 10 between the snap lid 30 and the flange 24. A plurality of tabs 42 extend from the trim ring 18, between the main wall 22 and the flange 24, to abut the peripheral edge 20 to position the main wall 22 a predetermined distance from the peripheral edge 20.

The snap posts 32 include an elongated leg 44 having a proximate end 46 attached to the flange 24 and an opposite distal end having a barb 48 supported thereon. The elongated leg 44 of the snap post 32 extends generally normal from the flange 24. The barb 48 engages with a top side 50 of the snap lid 30 to snap lock the snap lid 30, thereby attaching the trim ring 18 to the headliner 10 by compressing the headliner 10 between the distal end 38 of the snap lid 30 and the upper surface 40 of the flange 24.

A support structure 52 attaches to the snap post 32 to provide additional reinforcement to the snap post 32 such that the snap post 32 is retained in the locked position during the installation of the headliner 10. The support structure 52 includes a support leg 54 which is spaced apart from and parallel to the elongated leg 44. A support arm 56 extends transversely from the elongated leg 44 to a distal end of the support leg 54. The support arm 56 extends normally from the elongated leg 44 such that the elongated leg 44, support arm 56, support leg 54, and flange 24 form a generally box shape. The support leg 54 and the support arm 56 extend along the entire width of the elongated leg 44. The support structure 52 optionally includes a gusset 58 extending between the elongated leg 44 and a top side 60 of the support arm 56.

In a preferred embodiment the support leg 54 is positioned 3 millimeters away from the elongated leg 44. The support structure 52 is positioned such that there is a distance of at least 6 millimeters from a bottom side 62 of barb 48 and the top side 60 of support arm 56. The support arm 56 and the support leg 54 are formed having a thickness of 1 millimeter and extend the entire width of the elongated leg 44. The position of the support structure 52 provides sufficient reinforcement to the snap post 32 such that the trim ring 18 remains attached to the headliner 10 during the installation of the headliner 10, while still providing enough flexibility in the elongated leg 44 to allow the snap post 32 to quickly and easily snap lock with the snap lid 30 to attach the headliner 10 to the trim ring 18. In addition, the position of the support structure 52 prevents extreme stresses from forming in the snap post 32 which could cause permanent deformation or breaking due to the stress imposed during the installation of the headliner 10.

It is appreciated, of course, that the trim ring 18 is formed having a shape complimentary to the contours of the headliner 10. As seen in FIGS. 2 and 3, the flange 24 has a curved or slanted orientation to correspond to the shape of the headliner 10. Rather than orient each attachment 28 with the corresponding section of the trim ring 18, the snap lids 30 are attached to the main wall 22, by the living hinge 36, along a generally horizontal line. As such, the portion of the snap lids 30 adjacent the distal end 38 are tapered such that the distance between the distal end 38 and the upper surface 40 of the flange 24 is constant along the length of the snap lid 30.

Figure 5:
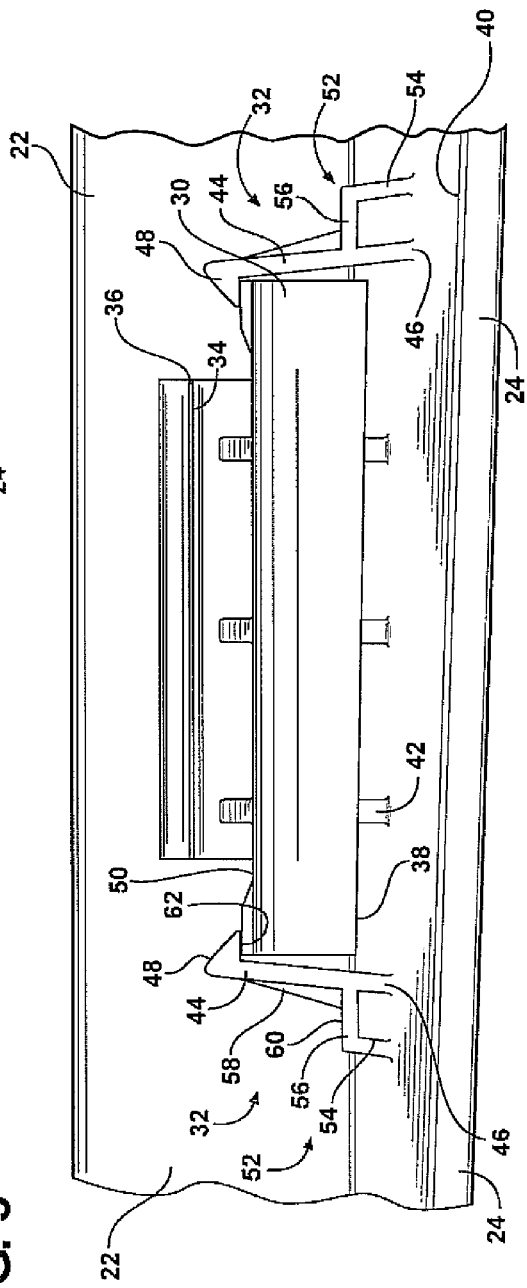
FIG. 5 is a front view illustrating the inventive snap post.

As the flange 24 is oriented to correspond to the contour of the headliner 10, the distance between the top side 50 of the snap lid 30 and the upper surface 40 of the flange 24 varies, as seen in FIGS. 3 and 5. Therefore, the height of the elongated leg 44 and the support leg 54 and the distance between the top side 60 of the support arm 56 and the upper surface 40 of the flange 24 also varies. In some circumstances the distance between the top side 50 of the snap lid 30 and the upper surface 40 of the flange 24 prevents the formation of the support structure 52 due to molding restrictions or the lack of the 6 millimeter distance between the bottom side 62 of the barb 48 and the top side 60 of the support arm 56. If the restrictions are present the snap post 32 is formed without the support structure 52 on that side of the snap lid 30.

From the foregoing, it can be seen that the present invention provides a snap post having a support structure which provides sufficient reinforcement to retain the attachment of the trim ring to the headliner 10 during the installation of the headliner 10. Having described the invention, however, many modifications thereto will become apparent to those skilled in the art to which it pertains without deviation from the spirit of the invention as defined by the scope of the appended claims.

It is claimed:

1. A trim ring for attaching to an opening of a headliner of an automotive vehicle, said trim ring having a main wall, a flange, and a snap lid, the main wall bounding the opening, the flange extending outwardly from the main wall, and the snap lid connected to the main wall, said trim ring comprising:
   a snap post having an elongated leg having a distal end, said elongated leg extending generally normal from the flange, said elongated leg supporting a barb disposed on said distal end for engaging with the snap lid of said trim ring; and
   a support structure connected to said snap post, said support structure having a support leg and a support arm, said support leg being spaced apart from and extending generally parallel with said elongated leg, said support arm extending from said elongated leg to said support leg;
   said snap post and said support structure being formed as one piece with said trim ring.

2. The trim ring of claim 1, wherein said elongated leg has a width, and wherein said support leg and said support arm extend along said width of said elongated leg.

3. The trim ring of claim 1, wherein said support leg is spaced three millimeters apart from said elongated leg.

4. The trim ring of claim 1, wherein a top side of said support arm is spaced at least six millimeters apart from a bottom side of said barb.

5. The trim ring of claim 1, wherein said support leg and said support arm are at least one millimeter thick.

6. The trim ring of claim 1, wherein said support structure includes a gusset extending between a top side of said support arm and said elongated leg.

7. A headliner assembly for covering an inner surface of an automotive vehicle roof having an aperture, said headliner assembly comprising:
   a headliner body having an upper surface facing the inner surface of the automotive vehicle roof, an opposite lower surface, and opening;
   a trim ring bounding a peripheral edge of said opening, said trim ring having a main wall and an outwardly extending flange having an upper surface which contacts a portion of the lower surface of the headliner body;
   a snap lid attached to said main wall by a living hinge;
   a snap post having an elongated leg extending outwardly from said flange and a barb supported on a distal end of said elongated leg for engaging with said snap lid to compress said headliner body between said snap lid and said flange; and
   a support structure having a support leg spaced apart from said elongated leg, and a support arm extending traversely from said elongated leg to said support leg.

8. The headliner assembly of claim 7, wherein said support leg extends generally parallel to said elongated leg.

9. The headliner assembly of claim 7, wherein said elongated leg has a width, and wherein said support arm extend along said width of said elongated leg.

10. The headliner assembly of claim 8, wherein said support leg is spaced three millimeters apart from said elongated leg.

11. The headliner assembly of claim 8, wherein a top side of said support arm is spaced at least six millimeters apart from a bottom side of said barb.

12. The headliner assembly of claim 8, wherein said support leg and said support arm are at least one millimeter thick.

13. The headliner assembly of claim 8, wherein said support structure includes a gusset extending between a top side of said support arm and said elongated leg.

14. A trim ring for attaching to an opening of a headliner body of an automotive vehicle, said trim ring comprising:
   a main wall bounding a peripheral edge of the opening;
   a flange extending outwardly from said main wall;
   a snap lid connected to said main wall;
   a snap post having an elongated leg extending outwardly from said flange and a barb supported on a distal end of said elongated leg for engaging with said snap lid to compress the headliner body between said snap lid and said flange; and
   a support structure having a support leg spaced apart from said elongated leg, and a support arm extending traversely from said elongated leg to said support leg.

15. The trim ring of claim 14, wherein said snap lid is connected to said main wall by a living hinge.

16. The trim ring of claim 14, wherein said support leg extends generally parallel to said elongated leg.

17. The trim ring of claim 14, wherein said elongated leg has a width, and wherein said support arm extends along said width of said elongated leg.

18. The trim ring of claim 14, wherein said support structure includes a gusset extending between a top side of said support arm and said elongated leg.

19. The trim ring of claim 14, wherein said support leg is spaced three millimeters apart from said elongated leg, wherein a top side of said support arm is spaced at least six millimeters apart from a bottom side of said barb, and wherein said support leg and said support arm are at least one millimeter thick.

* * * * *